United States Patent

Onken et al.

[11] Patent Number: 6,163,744
[45] Date of Patent: Dec. 19, 2000

[54] AIRCRAFT FLIGHT CORRECTION PROCESS

[75] Inventors: Reiner Onken, Ottobrunn, Germany; Thomas Prévôt, Santa Clara, Calif.

[73] Assignee: Euro Telematic GmbH, Ulm, Germany

[21] Appl. No.: 09/125,119

[22] PCT Filed: Feb. 4, 1997

[86] PCT No.: PCT/EP97/00490

§ 371 Date: Jul. 21, 1999

§ 102(e) Date: Jul. 21, 1999

[87] PCT Pub. No.: WO97/29438

PCT Pub. Date: Aug. 14, 1997

[30] Foreign Application Priority Data

Feb. 10, 1996 [DE] Germany ............... 196 04 931

[51] Int. Cl.[7] .................................................. G05D 1/08
[52] U.S. Cl. .............................. 701/3; 701/10; 340/979
[58] Field of Search ..................... 701/3, 9, 10, 14, 701/18; 340/961, 979, 973; 342/29, 451, 455; 244/17.13, 175, 178, 180, 181

[56] References Cited

U.S. PATENT DOCUMENTS

| | | | |
|---|---|---|---|
| 4,811,230 | 3/1989 | Graham et al. | 701/3 |
| 4,812,990 | 3/1989 | Adams et al. | 701/200 |
| 5,398,186 | 3/1995 | Nakhla | 701/16 |
| 5,574,647 | 11/1996 | Liden | 701/200 |
| 5,715,163 | 2/1998 | Bang et al. | 701/202 |
| 5,892,462 | 4/1999 | Tran | 340/961 |

*Primary Examiner*—Tan Nguyen
*Attorney, Agent, or Firm*—Venable; Norman N. Kunitz

[57] ABSTRACT

Modern flight control systems should be largely automated because of their complexity. A process is disclosed to automatically correct an originally planned aircraft flight after flight-relevant parameters are changed. The process has the following steps: (a) the values of the flight-influencing parameters which determine the planned flight are supplied to a computer and stored therein; (b) when a change occurs, the changed values are also supplied to the computer and compared therein to the stored values; (c) depending on the results of the comparison and on predetermined checking and selection criteria, it is first checked whether the change requires a flight correction, and if that is the case new parameter values for a corrected flight are determined and stored in the computer instead of the previously stored parameter values; (d) the flight correction determined by the new parameter values is initiated; (e) these process steps are repeated whenever necessary every time the parameter values are changed. This process is mainly useful to improve flight planning operations before and during instrument flying in aircraft provided with modern flight equipment.

13 Claims, 7 Drawing Sheets

AIRCRAFT FLIGHT CORRECTION PROCESS

BACKGROUND OF THE INVENTION

The invention relates to a method of correcting the flight of an aircraft, in which method the values of flight-influencing parameters that determine the predetermined flight are supplied to a computer and stored there.

Methods of this type can generally be used in flight-control systems for manned or unmanned aircraft such as airplanes, helicopters, airships, etc.

These methods are particularly suited for use in modern aircraft that are equipped with a flight-control system, especially a flight-guidance/flight-management system (FMS).

In the field of aviation, the increasing air-traffic density, the increasing complexity of modern aircraft and the associated, more complicated job of aircraft pilots have led to considerations of how pilots can be supported in different cockpit activities to make flying safer. The results of these considerations are, for example, navigation-management systems or the aforementioned flight-guidance/flight-management systems, which, however, require numerous manual pilot inputs for adapting the generally predetermined flight between start and landing, that is, the "flight plan," to current air-traffic control instructions and changes in the particular aircraft or the environment. Consequently, the pilots are frequently diverted from other tasks, which can pose a safety threat. Since, because of this problem, the adaptation of the flight is often omitted under time constraints, the advantages of these systems are frequently not utilized during the entire flight.

It is therefore the object of the invention to provide a method with which the provided flight of an aircraft can be automatically corrected following a change in the flight-relevant parameters.

SUMMARY OF THE INVENTION

The above object generally is achieved according to the present invention by a method of correcting the flight of an aircraft, in which method includes the following features:

the values of flight-influencing parameters that determine the predetermined flight are supplied to a computer and stored there;

if a change in these values occurs, the changed values are likewise supplied to the computer and compared there to the stored values;

using the comparison results and predetermined checking and selection criteria, the computer first checks whether a flight correction is necessary due to the change in the parameter values, and, if need be, the computer subsequently determines new parameter values for a corrected flight and stores them in the computer instead of the previously-stored parameter values;

the flight correction stipulated by the new parameter values is initiated; and with each further change in the parameter values, the method steps are performed again as needed.

An essential advantage of the invention is that it permits an autonomous as well as interactive creation of flight plans as a reaction to, for example, air-traffic control instructions or incomplete pilot inputs. These changed flight plans effect a change in the flight path if they are supplied to the aircraft (e.g. the airplane) via the flight-guidance/flight-management system and the auto pilot, for example, or if the pilot flies the aircraft manually.

In contrast to the methods employed in pilot-support systems conceptualized up to now (see /1/, for example), the method of the invention can be used without comprehensive infrastructure-related measures, for example in a modern commercial aircraft. Commercial use could thus very soon remedy the main problems of current flight-guidance/flight-management systems (complicated reprogramming in stressful flight phases), and thereby permit extensively-automatic flying (with pilot control) from start to landing, even in unusual situations.

The invention is described in detail below in conjunction with the drawings.

DETAILED DESCRIPTION FOR PREFERRED EMBODIMENT

Figure 1:
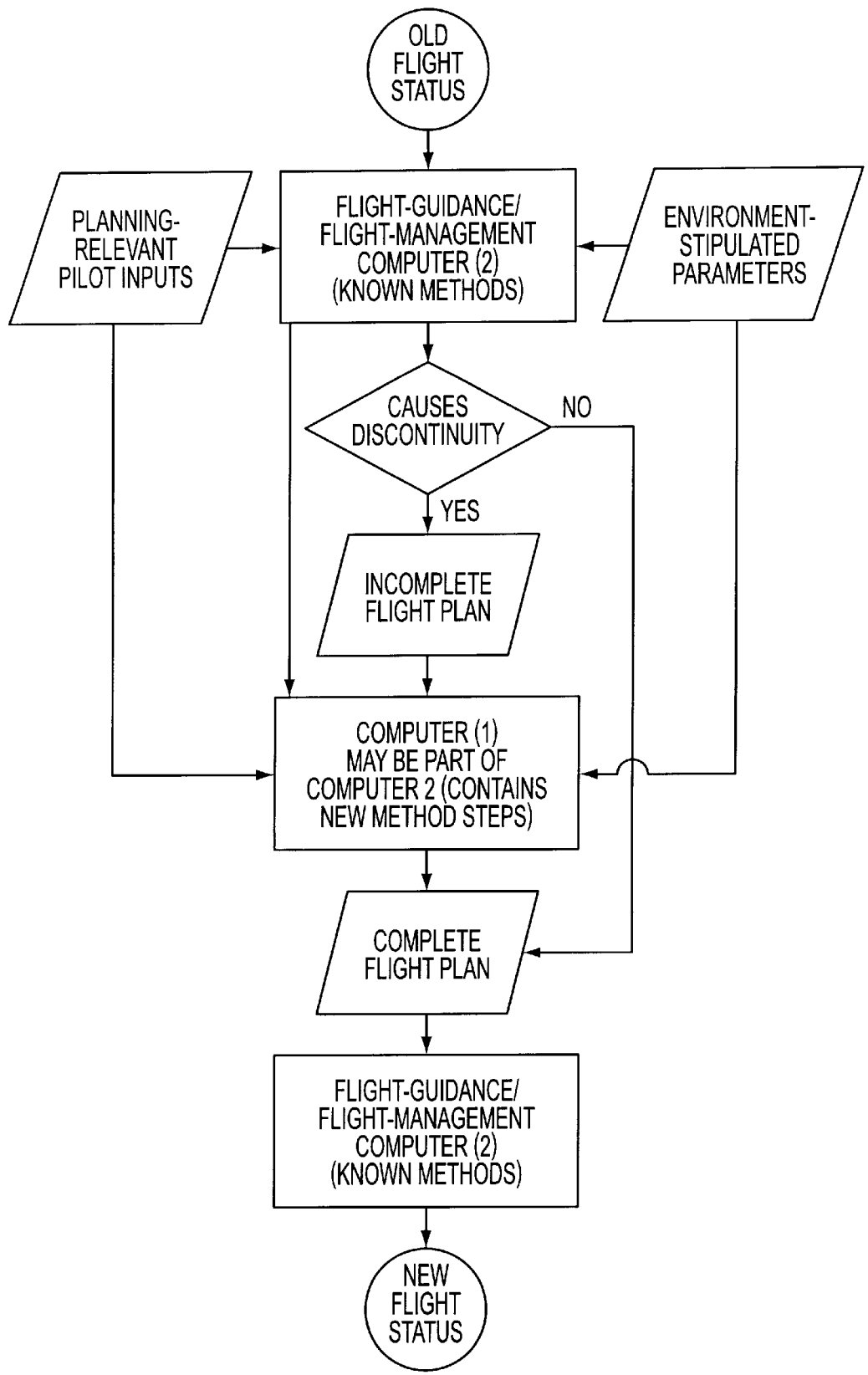
FIG. 1 is a flow chart of a change in flight status that is effected with the aid of a preferred embodiment of the method of the invention and a flight-guidance/flight-management system.
Figure 3:
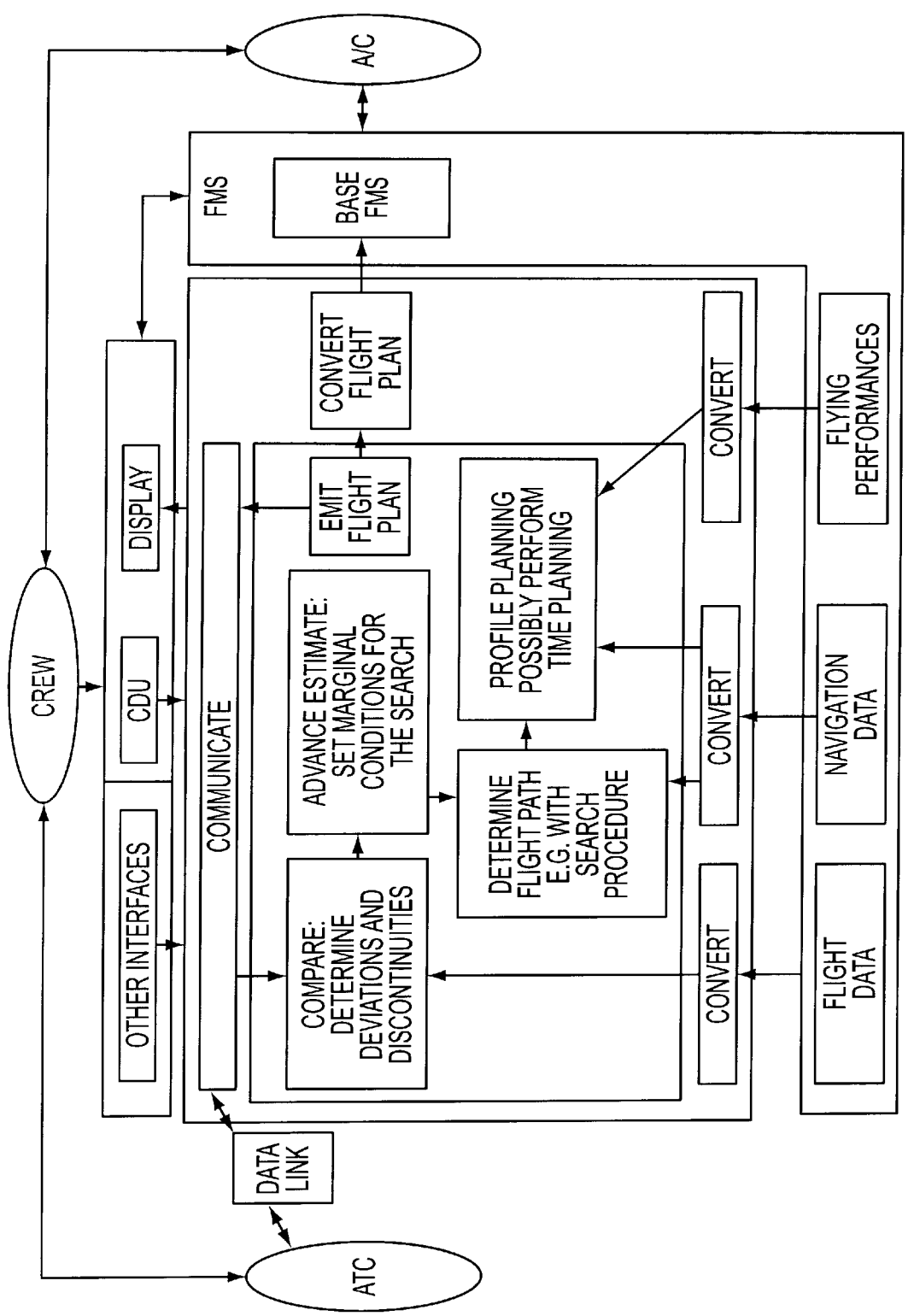
FIG. 3 is a functional representation, similar to a block diagram, of the preferred embodiment of the method of the invention according to FIG. 1, FIGS. 4–5 schematic representation of an example of a predetermined flight path that is changed in the lateral plane over the course of the flight of an aircraft, with an occurring discontinuity in the flight path (FIG. 4), and with a flight path that is corrected without discontinuity (FIG. 5), according to a preferred embodiment of the method of the invention.

The embodiment of the invention shown in FIGS. 1 and 3 is based on an aircraft (e.g., an airplane) that is equipped with a computer-aided flight-guidance/flight-management system. In this example, to make the transition from the old flight status to the new flight status, for example, following a change in heading, the following method steps are performed:

the flight plan, the flight status and further, environment-stipulated parameters present at a flight-guidance/flight-management computer 2 are supplied to a computer 1 and stored there;

the planning-relevant change inputs (e.g. for the heading) are supplied to the mechanical systems of the aircraft, computer 1, and stored there;

in computer 1, it is verified whether this information necessitates a change in the flight plan or causes a discontinuity in this flight plan;

as needed, computer 1 requests navigation data and, if present, flying-performance data from the databases that are also available to computer 2;

in computer 1, in the event of a lateral discontinuity or deviation, the flight path is corrected laterally within the discontinuity with the aid of a suitable search-and-selection procedure;

afterward, or in the event of a purely-vertical discontinuity or deviation, the flight-altitude profile is corrected or re-generated, at least for the region of the discontinuity or, if needed, for the entire remaining flight plan; and this corrected flight plan is supplied to computer 2.

Here computers 1 and 2 can be physically separate or configured as one computer. It must be ensured, however, that computer 1 continuously obtains the current flight plan, the current flight-status values and the current environment-stipulated parameters, such as atmospheric values, navigation values and the like. Furthermore, computer 1 can access the navigation database and, if provided, the flying-performance database of computer 2 at any time.

Examples of planning-relevant change inputs that must be supplied to computer 1 include all air-traffic control instructions or, as substitutes, the auto-pilot inputs of the pilot and the pilot inputs for course, altitude and speed that he also supplies to computer 2 for planning purposes. Hence, it is ensured that a deviation from the previous flight plan, which often results in a discontinuity, is identified.

A deviation from the provided flight plan is present if, for example, an air-traffic control instruction that differs from the flight plan is fed into the system, or if, for example, the pilot is obviously transferring the aircraft into a nominal status that differs from the provided flight plan, or clearly wishes to do so. This can be recognized in that a different flight altitude, a different course or a different speed is assumed steadily, or nominal values deviating from the flight plan are inputted to the auto pilot.

A discontinuity in the flight plan is present if a flight-guidance/flight-management system of the aforementioned type were to transmit a discontinuity indication to the pilot. This means that, in this type of situation, the flight plan is not complete in its path guidance (laterally) and/or in its altitude guidance (vertically), and therefore cannot be followed continuously to the end.

At this point, in the current state of the technology, the pilot would have to complete the flight plan through his own inputs, or shut down the flight-guidance/flight-management system when the discontinuity occurred, for manually performing the necessary auto-pilot and frequency settings or control activities.

In contrast, with the use of the method of the invention, the aircraft can continue to change its position in space automatically according to external presettings, and discontinuities can automatically be bridged. For this purpose, in a preferred embodiment of the method, when a lateral discontinuity occurs, a suitable flight path can be determined from the data stored, for example, in a navigation database with the aid of a suitable search-and-selection procedure. This search-and-selection procedure determines the flight path from a previously-estimated end of the current status, or the current preset, until a predetermined destination point, for example until the destination airport. The search-and-selection procedure can be based on, for example, the A* algorithm known per se (see, for example, /2/), or another, suitable search algorithm. This type of algorithm searches the most favorable flight path from a starting point to a destination point in that the flight path up to this point is expanded by new path elements. These elements are selected according to certain criteria. A decisive factor for the functioning capability of the algorithm is that as many of the following criteria as possible be applied:

segments of standard routes, such as airways (not only direct connections between two path points) can be allowed;

the route is not planned directly to the runway of the target airport, but first to a fixed final approach point ("Final Approach Fix");

the route is only planned as of the last reliably-known or estimatable point in the flight path (if nothing is known, planning occurs as of the instantaneous aircraft position);

the following criteria are factored into the evaluation of the path elements:

the association of the respective path element with standard routes;

the direction of the respective path element, in relation to the direct connection between start and destination;

The length of the respective path element, in relation to the status of the on-board and/or ground navigation facilities; and/or the position of the respective path element, in relation to detected local weather disturbances (contrary winds, storms, thunderstorms, hail, snow, fog, etc.);

the gain of space due to the respective path element;

the entire path is additionally evaluated according to the following criteria:

path length foreseeable fuel consumption;

the search-and-selection procedure is ended when the optimum path has been found, or a sufficiently-good path has been found, or after a certain number of attempts (e.g. 500), no better path has been found, or all possible paths have been tested, or a maximum number (e.g. 10,000) of paths has been evaluated.

A lateral flight path is basically found with a search-and-selection procedure that employs these criteria. If the range of the discontinuity is relatively small, however, namely smaller than, for example, 50 NM (particularly with a presetting of a new heading during the approach), the flight plan can also be determined by way of a less involved procedure instead of a complex search-and-selection procedure (NM=nautical miles; 1 NM=1.8532 km). In the former procedure, starting from the estimated end point of the flight plan, a path guidance is determined through the insertion of further flight-path elements prior to the discontinuity; this guidance sufficiently slopes into the approach ground line at an adequate altitude and sufficiently far in advance of the actual landing end phase.

Through modification of the criteria, or changes in the importance of individual criteria among themselves, priorities can also be changed, so it is possible to adapt to different requirements without altering the method. In other words, the method is suitable for both the contemporary air-traffic situation, in which radio-navigation methods are frequently used and the flight paths lead across airways, and future situations, in which navigation will be effected independently of airways and radio ranges, for example, with the aid of satellite-navigation methods.

If the flight path is closed laterally, the flight-altitude profile is automatically re-established, which is now possible because the lateral flight path is known. For this purpose, if the flying-performance database of the flight-guidance/flight-management computer is provided, it can also be used.

A time/speed planning can follow this altitude-profile planning, because all of the necessary parameters are then present. Depending on the type of discontinuity or deviation (flight segment, flight altitude, speed, time), individual planning stages can be omitted.

The completed, corrected flight plan is supplied to computer 2, so all of the supporting functions provided by the flight-guidance/flight-management computer 2 further remain available, but without additional stress on the pilot due to extensive reprogramming procedures. If the corrected flight plan is supplied directly to the flight-guidance/flight-management system, the method effects a corresponding change in the flight position of the aircraft or airplane in space.

Figure 4:
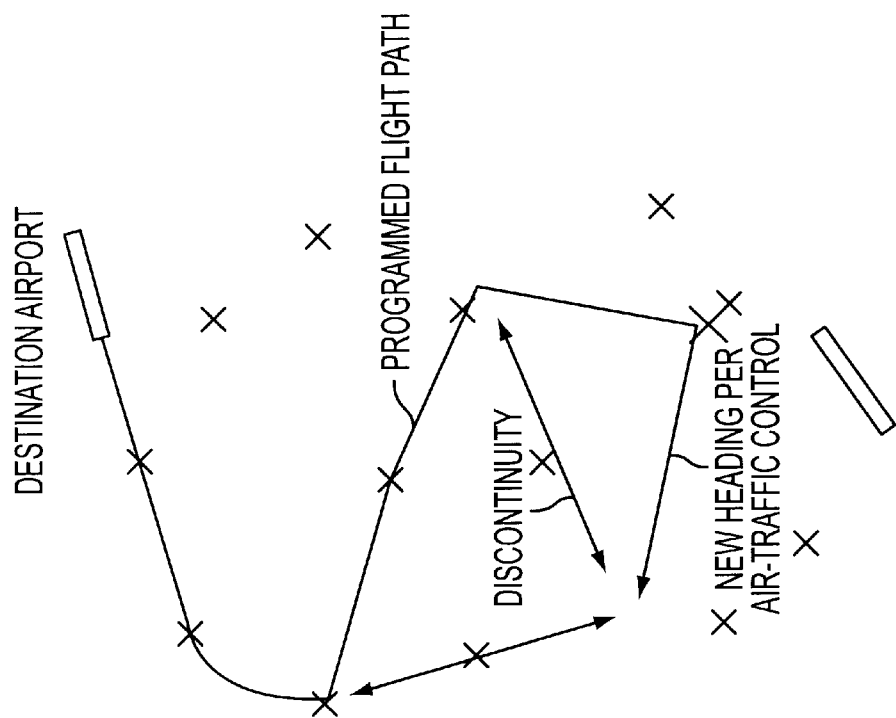

A general application example is described below, the basis of which is the following situation typical for day-to-day flight operations:

When approaching an airport, the pilot of a modern commercial aircraft is instructed to fly a particular heading that deviates from the programmed flight-path data in the flight-guidance/flight-management system ("Flight-Management System" (FMS)) (see FIG. 4, where, as in FIGS. 5 through 10, the flight path is represented in the lateral plane: Radar ranges are respectively represented by a cross, the start and destination airports by a narrow rectangle, the instantaneous aircraft position by a symbolic aircraft, and its flight path by a black line). The pilot enters this heading into his FMS and obtains from the FMS the message "Lateral Discontinuity" as a reaction, or enters the new heading directly at the auto-pilot operator unit. In both cases, an extensive re-planning of the remainder of the approach would be necessary for the pilot, and would be accompanied by a reprogramming of the FMS, which frequently results in a pilot shutdown of the FMS.

Figure 5:
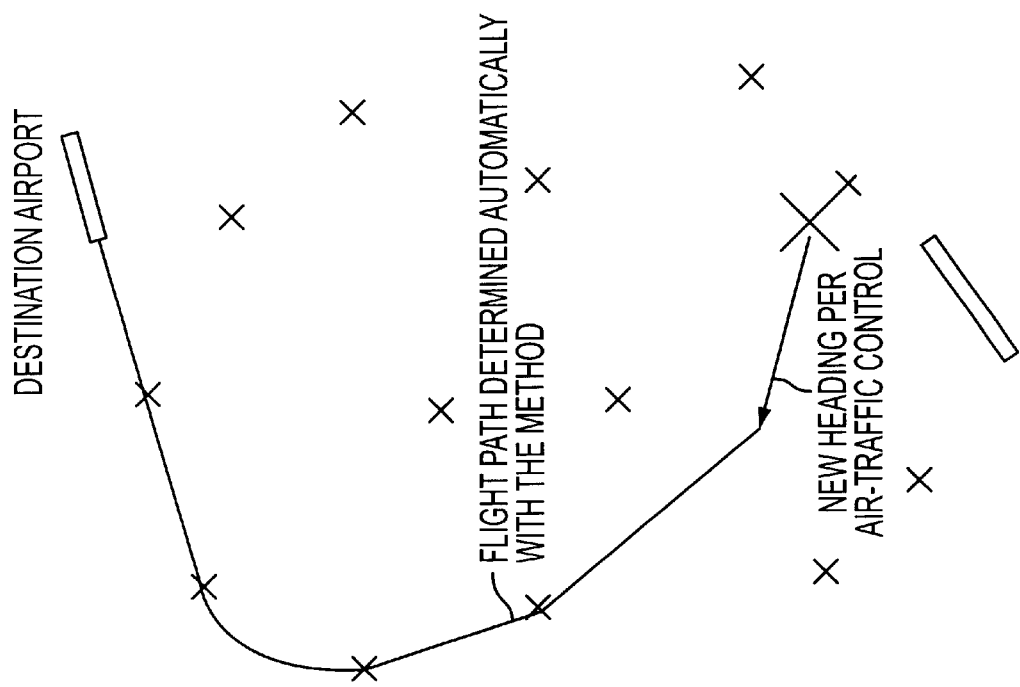

In the proposed method of the invention, the deviation or discontinuity is not only identified, but automatically eliminated. In the method, first the time frame for which the new (changed) entered heading is expected to be valid is estimated, for example as 40 seconds. Then the position at which the aircraft is expected to be located in, for example, 40 seconds, is calculated from the flown speed, the position, the new heading, the instantaneous heading and the flight altitude of the aircraft, as well as the wind conditions and this time frame. Then all navigation points and airways located in the region between this position and the final-approach portion of the runway of the destination airport are requested from the navigation database of the aircraft. With the aid of a search-and-selection procedure (e.g. with the use of the aforementioned A* algorithm), a suitable flight path is now searched that closes the gap between the calculated position and the final-approach destination, and can be regarded as likely being the optimum path guidance (FIG. 5). If the flight path (in the lateral plane) is known, the flying-performance data of the aircraft are requested from the flying-performance database of the FMS. These data are used to help plan the flight-altitude profile on the determined flight path as follows: First, the position is determined at which the last-provided flight altitude is attained. Then the nominal altitude at the starting point of the final approach is extracted from the additional navigation data of the flight plan. If the flight path and the flying performances are known, a favorable altitude guidance can easily be determined between these two altitudes with the use of, for example, a suitable optimization method. Because typical velocities can serve as a basis, as a function of the flight segments, the new aircraft arrival time can be determined precisely at different path points, as well as at the destination airport. The flight plan processed in this way is supplied again to the aircraft FMS very quickly following the air-traffic control instructions, so the corrected flight plan is displayed on a monitor in front of the pilot, and the automatic solution can be made clear to him. All of the functions of the FMS known per se can be used further without additional reprogramming. The aircraft can be automatically or manually brought in for a landing.

Figure 2:
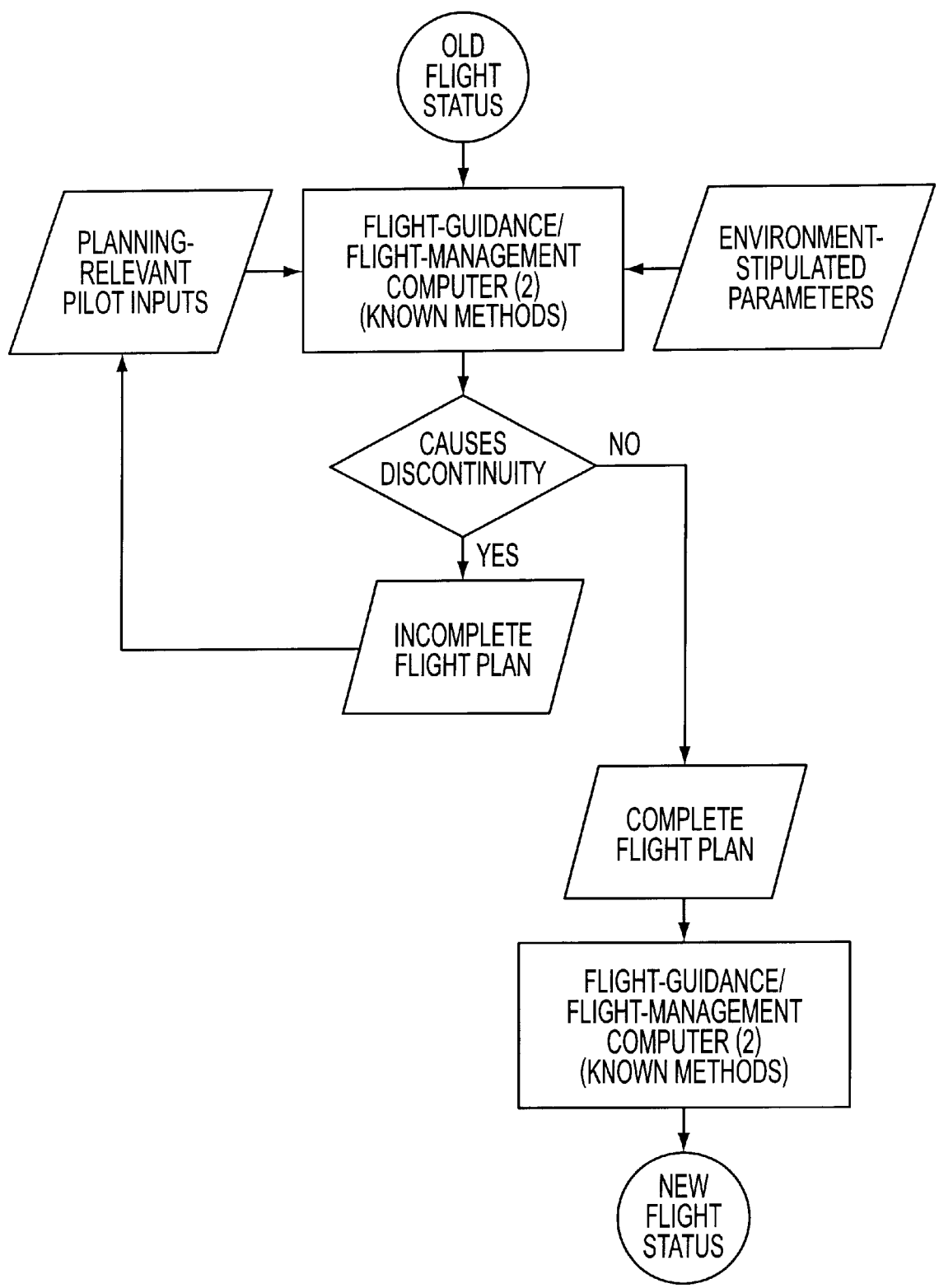
FIG. 2 is a flow chart of a change in flight status that is effected with the aid of a known flight-guidance/flight-management system (compare to FIG. 1)

FIGS. 1 and 2 outline the difference ensuing from the use of the method. A specific approach flight status (calculated as the old flight status) is stored in a flight-guidance/flight-management computer that operates according to a conventional method. New planning-relevant change inputs, such as the pilot's inputs, are stored in the system and, with further, environment-stipulated parameters, result in a new flight plan. Depending on the input, this flight plan may or may not include a discontinuity. Such a discontinuity is present, for example, if the pilot selects a path point that was not included in the previous flight plan. If only an incomplete flight plan is produced, the pilot must store a series of further inputs in advance if he wishes to obtain a complete flight plan that he can then have the auto pilot convert into a new flight status over a lengthy period of time (FIG. 2).

In contrast, according to the method of FIG. 1, the incomplete flight plan is transferred, along with the values present at the FMS computer (2), to a further computer (1), which operates in accordance with the proposed method. This computer now automatically generates a complete flight plan that can again be converted into a new flight status by way of the functions already present in the flight-guidance/flight-management computer (2), or manually converted.

FIG. 3 shows a simplified representation of an advantageous embodiment of a future cockpit equipped with an FMS and other communication partners. Here the primary components of contemporary flight-guidance/flight-management computers are indicated by 'FMS.' Flight data, navigation data and flying performances are made available by the core system referred to as 'Base FMS,' which, as a generic term, should encompass all of the functions employed in the present state of the technology. This unit is connected to the aircraft and different interfaces to the crew. Through conversion methods, these data can also be made available for the method steps indicated in the core of FIG. 3. These conversions are necessary if the data produced by the FMS are present in different formats from those they must be in when they are needed by the procedure computer. Moreover, the entire system is connected to the air-traffic control and the airline of the aircraft by way of a digital data connection (data link). When new planning-relevant information is received, the individual method steps are performed. Deviations or discontinuities are determined. As needed, an advance estimation is performed for establishing the marginal conditions for the search. Afterward, a corrected route is determined with the aid of navigation and flying-performance data, and both the flight path and flight time are re-planned. Finally, the flight plan is again made available to the base FMS.

The unit is connected to pilot-input interfaces, which include a control and display unit (CDU) and a flight control unit (FCU, not shown). Moreover, graphic (not shown) and linguistic input media can be connected. The central unit further includes apparatuses for a digital data link to air-traffic control and the center of the airline of the aircraft, and interfaces to further aircraft-navigation systems. The unit thus represents a high-quality flight-management system that is integrated into the cockpit, as is provided for future commercial aircraft and is already being used to some extent.

This arrangement and the general application embodiment serve in the detailed description of the method by way of three special embodiments. These embodiments are not mutually exclusive; rather, they can be used in conjunction, depending on the task at hand and the situation. Thus, the search illustrated in simplified form in the following Example 1 can preferably be performed in the vicinity of an airport. If the aircraft is further away from the destination airport (e.g. still on the ground at the starting airport), it is preferable to use a method such as the one illustrated in Examples 2 and 3. This distinction and selection can be integrated as a component of the entire method.

EXAMPLE 1

Configuration: Method with simplified search
Example situation: Pilot assumes new heading in vicinity of airport
Shown in: FIGS. 6 through 10

Figure 7:
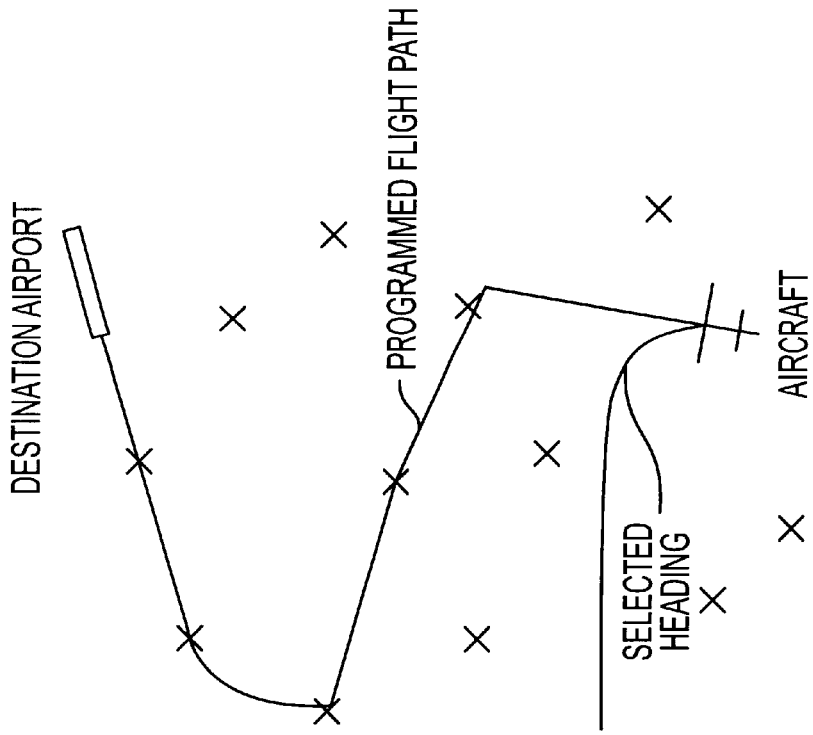
FIGS. 6–10 are schematic representations of different stages of the aircraft flight path to be corrected following a change in the heading, the correction being effected according to an advantageous variation of the preferred embodiment of the method in accordance with the invention, and FIG. 11 a schematic representation of a stage of the flight path of an aircraft to be corrected following a change in the heading, the correction being effected according to another advantageous variation of the preferred embodiment of the method according to the invention.
Figure 6:
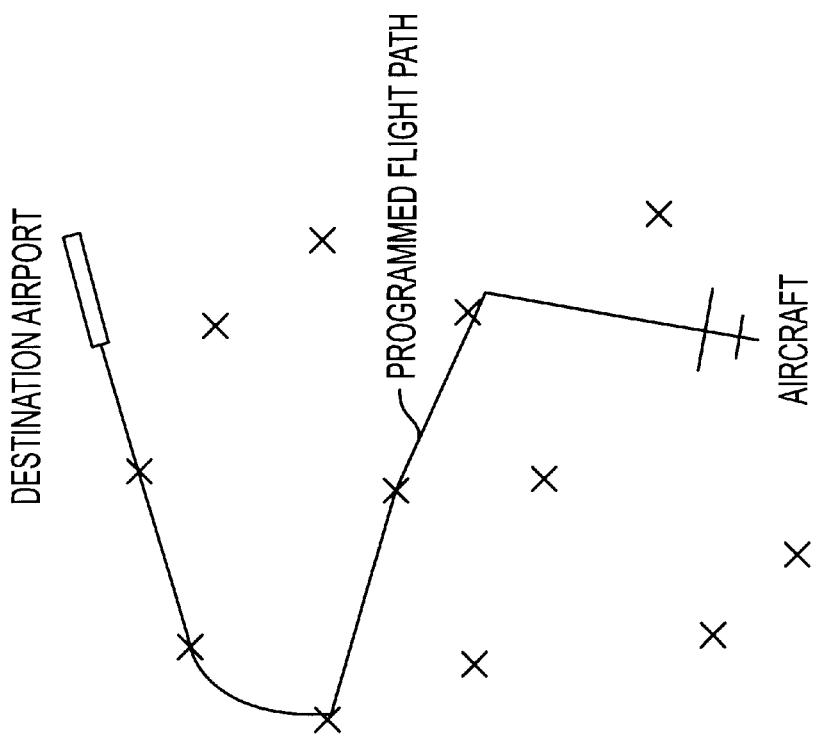
Figure 9:
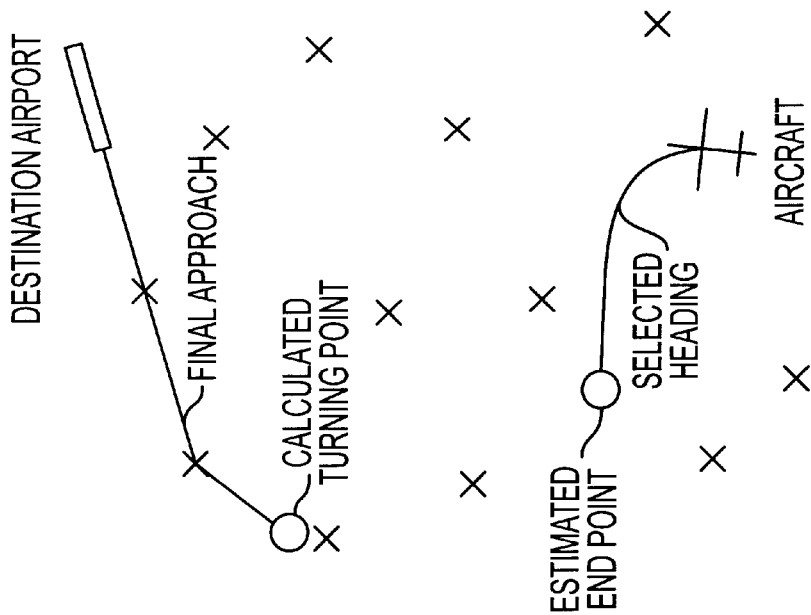

In the initial situation, the aircraft is, for example, about 25 NM from the airport at an altitude of, for example, about 8000 feet. The flight plan in the FMS and the procedure computer is at current status. This initial situation is illustrated in FIG. 6. The pilot now assumes a new heading at the auto-pilot operator unit. In previous systems, this would have had no impact on the pre-programmed flight path, provided that the pilot did not explicitly reprogram the path (FIG. 7).

The flight status, the flight plan and this planning-relevant change input by the pilot must now be supplied to the procedure computer (computer 1 in FIG. 1).

In the above-described method, the difference between the nominal heading according to the predetermined flight plan and the actual heading selected by the pilot is ascertained through a comparison of the two values. A difference should only be identified as such if the two courses exhibit a minimum difference—10 degrees is a suitable measure—and the selected heading remains constant for a certain minimum time period—an order of magnitude of 3 seconds is practical.

This selected heading is assumed to be a presetting for correcting the flight plan. Because the aircraft is near the destination airport, a simplified method of correcting the flight path is used.

In this method, it is assumed that an approach that is initiated by the assumption of a certain heading, a so-called 'vectored approach,' satisfies certain laws, so the approaches follow an extensively-predictable course.

First, the portions of the previous flight plan that are to be replaced by the correction are eliminated from a temporary flight-plan copy. In this example, in which the aircraft is in an approach toward the destination airport (closer than, for example, 50 NM and below, for example, 10,000 feet), it is assumed that the next point of a standard-embodiment/flight-management method (as is stored in the navigation database), to which the aircraft is to be guided back in the flight-path correction, will be the starting point of the final approach. Thus, the remaining flight plan can be assumed to be invalid. It is necessary to include in the detailed description whether the final approach (including an erroneous approach) is to be taken from the old flight plan or requested again from the database. It is essential for the method that the final approach be known vertically as well as laterally.

The destination region is determined in this manner. The next necessary step is to estimate where the new heading will take the aircraft.

Through trigonometric and flight-related mechanical relationships, first the point at which the aircraft will have attained the new heading is calculated. Factored in are the current aircraft position, the flight speed and the rotation rate, which can be assumed as, for example, 3 degrees per second with a standard rotation rate, insofar as no more precise value is available.

The length of the segment that is expected to be flown with a constant heading can be determined as follows: The typical duration of such a straight flight is determined depending on the distance of the aircraft from the starting airport and the destination airport (the closer airport is selected). This is effected in the form of a table that can be categorized as follows:

0 NM≦distance between aircraft and airport<15 NM: 30 s
15 NM≦distance between aircraft and airport<40 NM: 60 s
40 NM≦distance between aircraft and airport: 120 s This table can be refined or replaced by a continuous function.

Figure 8:
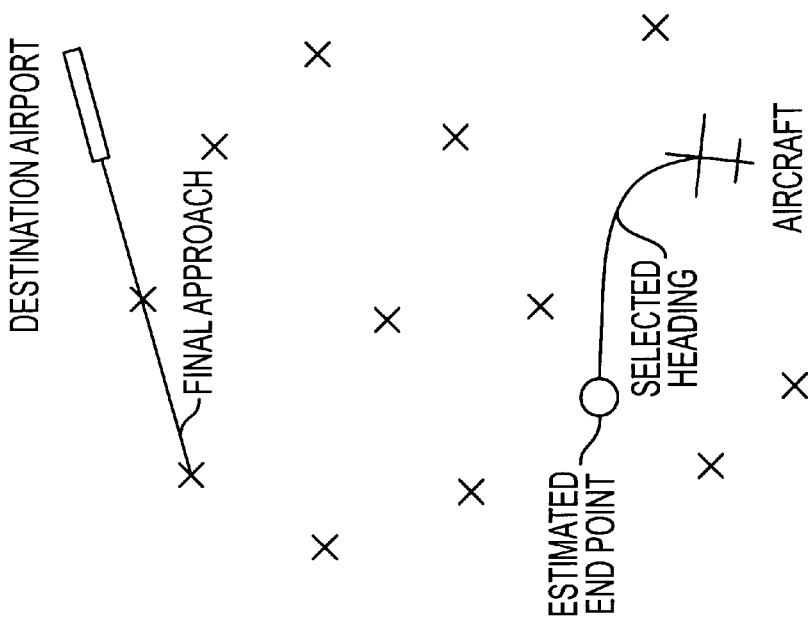

In the present example, a duration of 60 s results with a distance of 25 NM. With this duration, and consideration of the wind, the point is estimated at which the aircraft will be located after 60 seconds. Thus, the marginal conditions for the further method steps are established (FIG. 8).

These settings yield a discontinuity in the flight plan between the estimated end point of the segment with the constant heading and the final approach.

The simplified search-and-selection procedure used to solve the problem locally is based on certain rules, and is embodied as follows:

Different, typical, radar-guided approach courses are determined, and the course that is first to fulfill certain marginal conditions is selected. These marginal conditions are established by, among other things, the descent performances, the length of the flight path and the necessary course changes.

As a first flight course, it is assessed whether the linear extension of the heading intersects the approach ground line behind the estimated end point at an acceptable distance from the runway. In the process, the point of intersection between the runway extension and the heading straight line is determined. If this point of intersection is further from the destination airport than the latest point at which the aircraft should have reached the destination configuration for landing during the approach (for example, the external entry markings available from the navigation database or, as a substitute, a point in the approach at which the aircraft should be at least 1000 feet above the runway height), and, if this point of intersection is less than, for example, 20 NM away from the runway, this flight course is further investigated; if not, the course is rejected.

In the selected example of FIG. 8, the course is rejected, because the point of intersection (between the extended final-approach straight line and the straight line of the selected heading, which is extended beyond the estimated end point, the point not shown in FIG. 8) is too far away from the airport.

Hence, the next possible approach course is explored: Because the air-traffic control usually guides the aircraft to the final approach at a sloped angle of 30 degrees, the approach segment can be expanded around this sloped segment. To this end, it is determined from which side the sloping will occur (in FIG. 9: from above or below). It is assumed that the final approach typically slopes from the side on which the estimated end point of the predetermined heading lies. The use of a large set of rules for determining this side is also conceivable.

The exact position of the turning point is determined as the point of intersection between the straight line passing through the final-approach fix at (for example) 30 degrees and a straight line passing through the runway reference point on the same side at 5 degrees with respect to the final-approach direction. This corresponds to the way in which such pilots usually perform sloping maneuvers.

To complete the flight course, first the estimated end point and the calculated turning point are connected directly to one another.

The total path from the aircraft to the calculated turning point can be calculated. The altitude of the aircraft is known, as is the altitude at which the aircraft should be at the final-approach fix. To determine whether the altitude difference can be diminished on the segment above ground, the descent performances are extracted from the flying-performance database. If, in a comparison between the necessary descent path and the present descent path, it is seen that the present path is sufficient, taking into consideration the flying performances and, for example, an acceptable (passenger) comfort, the simplified search is ended. Otherwise, intermediate segments are inserted or the final approach is begun further away from the airport, that is, the final-approach fix is planned successively (respectively by, for example, 1 NM) further away from the airport, which leads to a longer overall path.

If the lateral flight path is determined with this procedure, the altitude course can be estimated. This can be effected in accordance with an optimization method or in accordance with certain rules that can be applied for the altitude course. In the described embodiment, rules according to the following model (for example) should be used:

If the aircraft must remain at the current altitude, plan a horizontal approach of, for example, one minute, and begin the further descent planning to the resulting point.

If the distance required by the aircraft for descending to the altitude at which the aircraft is intended to slope at the predetermined angle of approach is not much less (here by at least 3 NM, for example) than the available distance, plan a continuous descent (constant angle of approach) to the final approach.

If the aforementioned distance is considerably less, plan a segment of, for example, 3 NM with a constant altitude prior to reaching the final approach, and from this, calculate the most favorable point for beginning the descent, starting from the altitude that the aircraft should assume next (for example through external presetting of the altitude or selection at the auto pilot).

With rules of this type, a vertical discontinuity is avoided or corrected, and the flight plan is closed in two levels (laterally and vertically). On this basis, a time or speed planning can still be integrated into the flight plan, because all of the other marginal conditions are known.

If the flight plan has been closed, it is now transmitted (possibly after previous pilot confirmation) to the flight-management computer, which can perform the actions (display, auto-pilot actuation, etc.) based on the flight plan.

EXAMPLE 2

Figure 11:
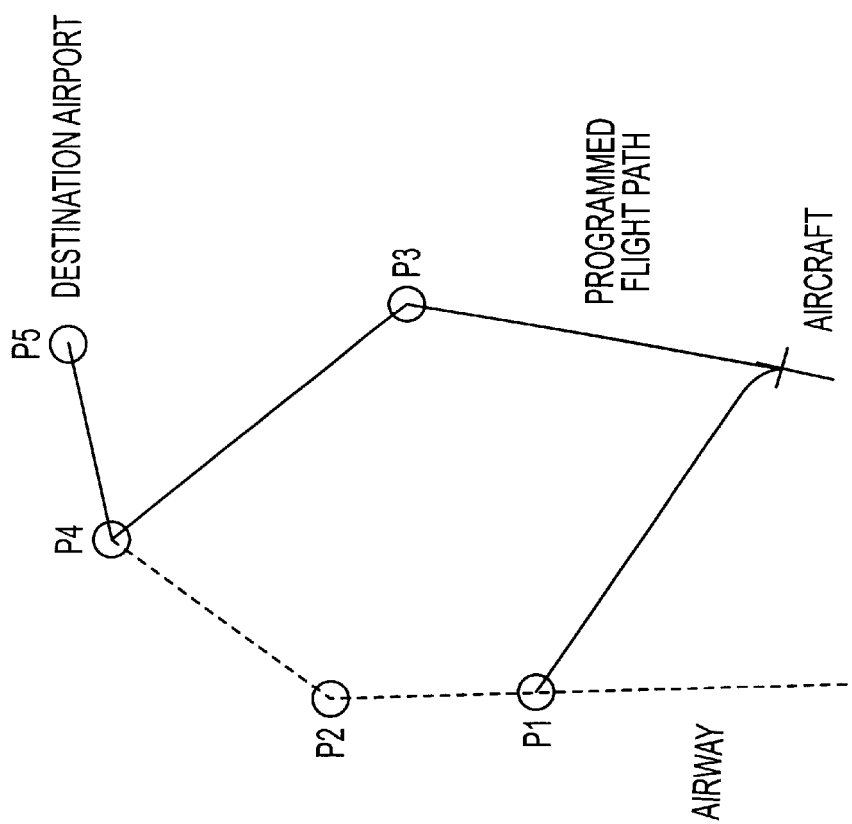
Figure 10:
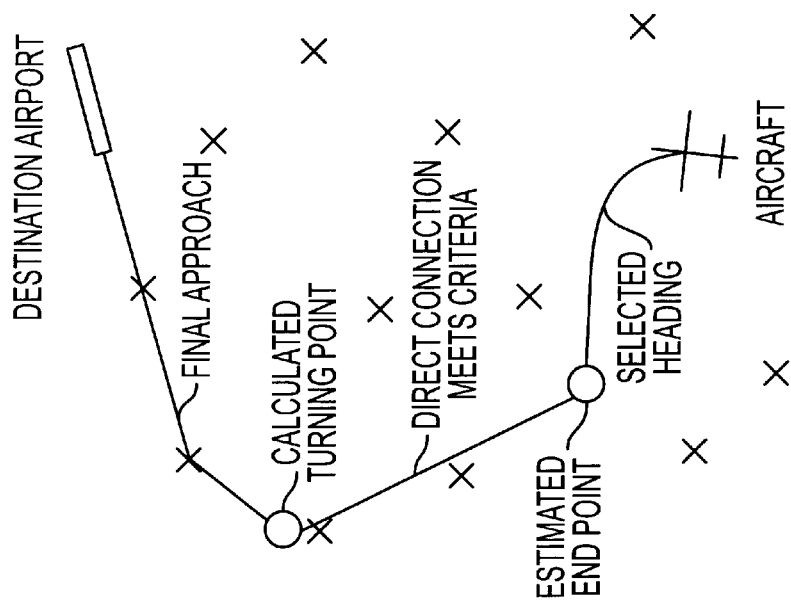

Configuration: New search-and-selection procedure
Example situation: Pilot enters a new path point into the GMS that he is to approach directly
Shown in: FIG. 11

In the initial situation, the aircraft is still far from the destination airport. The flight plan in the FMS and the procedure carrier is in the current state. At the input unit (CDU) of the flight-management computer, the pilot enters a path point that was not yet part of the previous flight plan. In systems used up to now, this would have led to a lateral discontinuity (refer also to FIG. 4) if the pilot did not close this explicitly through reprogramming.

The flight status, the flight plan and this planning-relevant change input must now be supplied to the other computer, namely the procedure carrier.

Although it is conceivable and, to some extent, practical, to partially modify the old flight plan, in this embodiment, as in Example 1, all of the flight plan segments—with the exception of the new path point that has just been entered—toward the path and of the final approach, along with a possibly-planned erroneous flight procedure, should be deleted from the flight plan. What remains is a flight plan from the instantaneous position of the aircraft to the recently-entered path point P1, with a discontinuity up to the final approach P4 (FIG. 11). This discontinuity is bridged with a new search-and-selection procedure.

In this procedure, first the following data are requested at the navigation database for establishing the search space:

All approach routes to the runway that is registered in the flight plan as the one to use.

If the aircraft is additionally within, for example, a 25-NM radius around the starting airport, additionally all takeoff routes of the established takeoff runway.

Furthermore, all airway segments are requested that are located in a specific spatial region around the newly-entered path point and the runway. This region can be determined by, for example, an ellipse, a rectangle or a rhombus. In this case, an ellipse (for example) should be used.

Moreover, all of the path points within the same region that represent a segment radio range are requested. The entirety of the observed possible path points results from all of the segment radio ranges and the path points, which are components of the produced approach/takeoff routes and airways.

This is the search space for the new path guidance to which the following algorithm is applied:

1 Determine the break-off conditions and the threshold values for the path elements to be evaluated.

2 Evaluate the direct connection from the start node to the destination node, and write it at the beginning of WAIT.

3 As long as no break-off condition is met, and paths are still contained in the waiting list, transfer the first path from WAIT to OPEN.

3a    Until the last path element of OPEN has been observed,
3a 1   Check whether the evaluation of the next path elements lies above the threshold value.
3a 2   If the evaluation of the path element lies above the threshold value, do nothing.
3a 2 [sic]   Until the last node has been observed, insert the next node that is not yet included in the path into this element.
3a 4   If the resulting path has already been observed, do nothing and proceed with step 3a3.
3a 5   If the resulting two new path elements have already been evaluated, incorporate this evaluation.
3a 6   Otherwise, evaluate these path elements and store the evaluations.
3a 7   Evaluate the entire path with the stored element evaluations in accordance with a quality function.
3a 8   If the total evaluation of the path is worse than or equal to the OPEN evaluation, sort the path corresponding to its evaluation according to CLOSED.

-continued

| | | |
|---|---|---|
| 3a | 9 | Otherwise, sort the path according to WAIT, noting the predetermined search width by first sorting behind the predetermined number of paths with fewer nodes. |
| 3b | | Sort OPEN according to CLOSED and proceed with step 3. |
| 4 | | Sort WAIT according to CLOSED. |

Explanations of the above terms

WAIT: Waiting list in which all paths are registered in the sequence of their previous evaluation, and are to be further explored.

OPEN: The flight path currently being observed.

CLOSED: The list in which all flight paths are registered in the sequence of their evaluation, and will finally be treated and not further improved.

The search-and-evaluation procedure begins with the evaluation of the direct connection from the start node to the destination node, in this example between the path point to be approached directly and the final-approach fix. The evaluation is described in a paragraph that follows. If the quality of this direct connection is insufficient because, for example, no standard route connects the two, and the distance is too great for a direct flight, the following procedure is performed: All path points in the search space are inserted consecutively as intermediate points between the start and destination points, and evaluated with the same quality function. Those which prove better than the initial path are sorted into the waiting list (WAIT) for further observation, while the worse ones are sorted into the list of its closed paths (CLOSED). All path-element evaluations are stored so they can be used further. This procedure is continued until one of the aforementioned criteria for ending the search procedure is met, when:

the optimum path has been found, or a sufficiently-good path has been found, or no better path has been found in a specific number of attempts (e.g. 500), or all possible paths have been tested, or a maximum number (e.g. 10,000) of paths has been evaluated.

The path evaluated as the best is registered in the flight path as a search result.

The value of a path is determined as follows:
In the proposed procedure, fundamental cost estimations are performed. These cost estimates ensue from a link of individual costs for the path elements contained in the path, as well as from a path evaluation that encompasses elements.

The aforementioned criteria, among other items, are factored into the evaluation:

a) Path elements:

the association of the respective path element with standard routes;

the direction of the respective path element, related to the direct connection between start and destination;

the length of the respective path element, in relation to the status of the on-board and ground navigation facilities;

the position of the respective path element, related to detected local weather disturbances;

the gain of space due to the respective path element;

b) Entire path:

the length of the path the foreseeable fuel consumption.

The greatly-simplified illustration in FIG. 11 is intended to explain the function of the method. Point P1 is the path point that should be approached directly. The originally-proposed flight plan includes the path points P3, P4, P5. The search space is determined by the path points P1, P2, P3, P4 (the segment P4, P5 of the final approach is unchanged). First, the path P1, P4 is evaluated. This path receives a high path-element evaluation with regard to the criterion of "direction of the path element, in relation to the direct connection between start and destination" criterion, and receives a low evaluation with regard to the criterion of "association with a standard route." For the sake of a clear overview, the other path-element criteria are not observed further. With regard to the criteria for evaluating the entire path, length and foreseeable fuel consumption, it again receives a maximum evaluation.

Due to the lack of an association with the standard route, the path P1, P4 appears insufficient for halting the search. Therefore, the paths P1, P2, P4 and P1, P3, P4 are evaluated for determining whether the evaluation can be improved through the insertion of a further path point. In actuality, the path P1, P2, P4 receives a better evaluation than the initial path P1, P4 because of its association with the standard route and the minimum diversion to be dealt with. The path P1, P3, P4, on the other hand, scores worse than or the same as the initial path P1, P4 in all points. Thus, the path P1, P2, P4 is selected as the best-evaluated. In contrast, current FMS's would have proposed the path P1, P3, P4 for bridging the occurring discontinuity, because these systems are programmed such that it is always proposed to return to the next path point (here P3) contained in the flight plan following the path point (P1) to be approached directly.

Also in this example, after the flight path has been laterally closed, altitude planning can be implemented. The rules for altitude planning must be supplemented to match the rules described in Example 1 in order to cover ascent and cruising segments. It is logical to integrate a method of determining the most favorable cruising altitudes that extracts these altitudes from flying-performance tables or curves, for example, as a function of distance, wind and semicircular flight levels. Finally, the vertical profile and the speed course can be determined through the lateral determination of the flight plan, so a complete flight plan is also created here and can be supplied to the flight-guidance/flight-management computer (2) for ensuring an automatic or manual takeoff.

The embodiment illustrated in Example 2 can also be applied to Example 1 in the event that the aircraft is further away from the airport. In this case, the estimated end point of the segment with a constant heading assumes the function of the directly-entered path point.

EXAMPLE 3

| | |
|---|---|
| Configuration: | Search-and-selection procedure based on the known A* algorithm (see, for example, /2/). |

Example situation: As in Example 2

For the sake of simplification, the same situation as in Example 2 is assumed. The only difference is that here the A* algorithm known per se is used as the search-and-selection procedure. This algorithm is realized as follows according to Winston (/2/):

"Procedure A*:

1 Create a list from partial paths: The initial list should include the zero length and a zero step path from the root to nowhere.

2 Until the list is empty, or the destination has been reached, determine whether the first path in the list reaches the destination node.

| | |
|---|---|
| 2a | If the first path reaches the destination node, do nothing more! |
| 2b | If the first path does not reach the destination node, |
| 2b1 | remove the first path from the list; |
| 2b2 | create new paths by expanding the removed path by one step; |
| 2b3 | insert the new path into the list; |
| 2b4 | sort the list according to the sum of the expended costs and the estimation of a lower limit of the residual costs, and favor the paths that incur the lowest costs! |
| 2b5 | If two or more paths reach a common node, cancel all of these paths to leave the one that helps us reach the common node at the lowest cost! |

3 When the destination node has been found, indicate success; otherwise, indicate failure." The heuristic in the search is expressed by the evaluation function with which the respective costs for the currently-opened path are calculated in step 2b4. These costs are expressed by an evaluation function f(n), with n as the current node. This is defined as:

$$f(n)=g(n)+h(n).$$

Here the term g(n) represents the accumulated costs of the path to the current node, and h(n) represents an estimation of the remaining costs up to the destination. The term g(n) for determining the accumulated costs can be determined with the path evaluation illustrated in Example 2. The remaining distance to the destination point can be used to determine h(n). It is then also possible to embody the method with this procedure.

In closure, it must be established for which situations the present method will be particularly effective.

The setting or presetting of a heading that deviates from the flight plan;

The approach or presetting of a path point that deviates from the flight plan;

A change in the runway direction in flight (here the new final-approach data must first be extracted from the navigation database);

Planning of the flight to a different airport from the destination airport established in the flight plan;

The request of an alternative flight plan (also via predetermined intermediate path points (the search procedure sequentially investigates all intermediate segments until the flight plan is closed);

The generation of a flight plan only after the presetting of the start and destination points;

The presetting of a flight altitude that deviates from the flight plan.

Cited literature:

/1/ Onken and Prévôt: "CASSY-Cockpit Assistant System for IFR Operation," Proceedings ICAS-2/7/94, Anaheim, California, USA, 1994

/2/ Winston: "Künstliche Intelligenz [Artificial Intelligence]," Addison-Wesley Deutschland, Bonn, 1987.

What is claimed is:

1. A method of correcting a flight of an aircraft, having the following features:

values of flight-influencing parameters that determine a predetermined flight are supplied to a computer and stored there;

if a change in these values occurs, the changed values are additionally supplied to the computer and compared there to the stored values;

using the comparison results and predetermined checking and selection criteria, the computer first checks whether a flight correction is necessary due to the change in the parameter values, and, if need be, the computer subsequently determines new parameter values for a corrected flight and stores them n the computer instead of the previously-stored parameter values;

the flight correction stipulated by the new parameter values is initiated;

with each further change in the parameter values, the method steps ar performed as needed; and wherein, in aircraft equipped with computer-aided flight control, the flight-relevant parameter values present at the flight-control computer (2) are supplied to the computer (1), and the flight-relevant change inputs are supplied to the aircraft's mechanical systems and stored there; in the event that the computer (1) determines that a flight correction is necessary, the new parameter values previously stored there, on the one hand, and, on the other hand, they are supplied to the flight-control computer (1) and stored there.

2. The method according to claim 1, characterized in wherein, in cases in which the flight correction stipulates a lateral and a vertical correction of the flight path underlying the flight, the flight path to be corrected is first corrected only laterally and, subsequently, the laterally-corrected flight path is corrected vertically.

3. The method according to claim 1, wherein the flight-relevant parameter values supplied to the computer (1) contain information about the flight path, flight times associated with the individual path elements, and flight velocities, the flight status, and further, environment-stipulated parameters.

4. The method according to claim 3, characterized in wherein the flight-relevant parameter values supplied to the computer (1) additionally contain information about flying-performance data for the aircraft, and/or navigation data.

5. The method according to claim 1, wherein, with a discontinuity in the provided flight path, as determined by the computer (1), the new parameter values for a corrected flight path without discontinuity are determined as follows:

with a purely lateral or purely vertical discontinuity, the flight path is corrected in the region of the discontinuity, or in the entire portion of the flight path that is still to be traversed, or with a mixed lateral-vertical discontinuity, the flight path is first corrected only laterally in the region of the discontinuity, or in the entire portion of the flight path that is still to be traversed, and the laterally-corrected flight path is subsequently corrected vertically.

6. The method according to claim 5, wherein the flight path is subdivided into path elements, and, in the correction of this path, individual path elements or all of the previous path elements of this path are replaced by new path elements.

7. The method according to claim 6, wherein, for correcting the flight path, at least one of search-and-selection procedures are used which
   also take into consideration segments of predetermined standard routes as path elements, in addition to direct connections between two points of the path,
   leave the air path between the final-approach fix and the destination point unchanged, and permit corrections only to path segments at the most up to the final-approach fix,
   only permit the corrections as of the last reliably-known or estimatable initial point of the path at the most up to the final-approach fix or destination point, and only for the case that this initial point cannot be given, allow the corrections as of the instantaneous aircraft position.

8. The method according to claim 6, wherein at least one the following criteria are used in the selection of the new path elements in the flight-path correction:
   the association of the respective path element with a predetermined standard route,
   the direction of the respective path element, in relation to the direct connection between two points on the path,
   the length of the respective path element, in relation to the status of the on-board and/or ground navigation facilities,
   the position of the respective path element, in relation to detected local weather disturbances, and
   the gain in space due to the respective path element.

9. The method according to claim 8, wherein at least one of, additionally, the entire length of the respective corrected flight path and the associated, foreseeable total flight time, the associated, foreseeable fuel consumption is or are considered in the selection of the path elements.

10. The method according to claim 7, wherein the search for the optimally-corrected flight path by means of the search-and-selection procedure is ended as soon as
    the optimally-corrected flight path has been found, or
    a flight path that is sufficiently corrected in accordance with predetermined break-off criteria has been found, or
    no better, allowable flight path has been found in a predetermined number of further attempts, or
    all possible flight paths or a maximum number of possible flight paths are evaluated, and the optimally-corrected flight path among them is determined.

11. A method of correcting a flight of an aircraft, in which method of the following features; values of flight-influencing parameters that determine a predetermined flight are supplied to a computer and stored there:
    if a change in these values occurs, the changed values are additionally supplied to the computer and compared there to the stored values;
    using the comparison results and predetermined checking and selection criteria, the computer first checks whether a flight correction is necessary due to the change in the parameter values, and, if need be, the computer subsequently determines new parameter values for a corrected flight and stores them in a computer instead of the previously-stored parameter values;
    the flight correction stipulated by the new parameter values in initiated; with each further change in the parameter values, the method steps are performed again as needed; and wherein, when used in aircraft equipped with a flight-guidance/flight-management system, upon a change in aircraft heading,
    a) first the time frame for which the new heading is anticipated to be valid is estimated;
    b) subsequently, the position the aircraft is anticipated to assume with the new heading after this time frame is calculated from the speed, the instantaneous position, the new heading, the instantaneous heading and the flight altitude of the aircraft, as well as the wind conditions and the estimated time frame;
    c) all navigation points and airways located in the region between the new position and the predetermined final-approach fix of the runway of the destination airport are requested from the navigation database of the aircraft, and, with the aid of the predetermined search-and-selection procedure, a laterally-corrected flight path is determined;
    d) and subsequently, a flight-altitude profile is created for this laterally-corrected flight path in that, first, the position is determined at which the last-provided flight altitude is attained, and then a favorable flight-altitude profile along the laterally-corrected flight path is created between this position and the predetermined nominal altitude at the final-approach fix.

12. The method according to claim 11, wherein speed values for the aircraft are predetermined for the individual path elements, and at least one of the foreseeable total flight time, the foreseeable arrival time, and the foreseeable fuel consumption of the aircraft is or are determined from the path and altitude guidance along the corrected flight path and the predetermined speed values for the individual path elements.

13. The method according to claim 11 wherein changes in heading in the vicinity of the destination point are not taken into consideration, and no corresponding correction of the remaining flight is effected, if the changes are within a predetermined solid angle, preferably within a solid angle of up to 5° to 15° around the respective instantaneous heading, or if the changed heading is maintained for only a predetermined maximum time, preferably 2 to 5 seconds.

* * * * *